United States Patent
López Quintela et al.

(10) Patent No.: US 10,968,104 B2
(45) Date of Patent: Apr. 6, 2021

(54) METHOD FOR PRODUCING SHEETS OF GRAPHENE

(71) Applicant: UNIVERSIDADE DE SANTIAGO DE COMPOSTELA, Santiago de Compostela (ES)

(72) Inventors: Manuel Arturo López Quintela, Santiago de Compostela (ES); Gagik Shmavon Shmavonyan, Santiago de Compostela (ES); Carlos Vázquez Vázquez, Santiago de Compostela (ES)

(73) Assignee: Universidade De Santiago De Compostela, Santiago de Compostela (ES)

( * ) Notice: Subject to any disclaimer, the term of this patent is extended or adjusted under 35 U.S.C. 154(b) by 636 days.

(21) Appl. No.: 15/540,303

(22) PCT Filed: Nov. 19, 2015

(86) PCT No.: PCT/ES2015/070832
§ 371 (c)(1),
(2) Date: Nov. 17, 2017

(87) PCT Pub. No.: WO2016/107942
PCT Pub. Date: Jul. 7, 2016

(65) Prior Publication Data
US 2019/0152783 A1    May 23, 2019

(30) Foreign Application Priority Data
Dec. 31, 2014 (ES) .................. ES201431974

(51) Int. Cl.
*C01B 32/184*    (2017.01)
*B82Y 30/00*    (2011.01)
(Continued)

(52) U.S. Cl.
CPC ............ *C01B 32/184* (2017.08); *B32B 33/00* (2013.01); *B32B 37/24* (2013.01); *B32B 38/10* (2013.01);
(Continued)

(58) Field of Classification Search
CPC .............. C01B 32/184; C01B 2204/22; C01B 2204/02; C01B 35/14; C01B 2204/04;
(Continued)

(56) References Cited

U.S. PATENT DOCUMENTS 8,834,967 B2 *   9/2014  Afzali-Ardakani ..................... C01B 32/194
                                                                 427/230
10,525,421 B1 *  1/2020  Kolel-Veetil ...... B01D 67/0058
(Continued)

FOREIGN PATENT DOCUMENTS

EP      2 567 938 A1    3/2013
WO    WO 2014/109619    7/2014

OTHER PUBLICATIONS

Novoselov, K. S., et al. "Two-dimensional atomic crystals." Proceedings of the National Academy of Sciences 102.30 (2005): 10451-10453.*

(Continued)

*Primary Examiner* — Richard M Rump
(74) *Attorney, Agent, or Firm* — Gary J. Gershik; Cooper & Dunham LLP

(57) ABSTRACT

The invention relates to a method for obtaining sheets of graphene, hexagonal boron nitride, molybdenum disulfide, tungsten disulfide or mixtures thereof from the powder of said materials. Said sheets consist of a set of strips, wherein said strips consist of between one and five layers. Said layers are layers of graphene, hexagonal boron nitride, molybdenum disulfide or tungsten disulfide having a monoatomic or (Continued)

monomolecular thickness. The invention also relates to a method for coating a surface with sheets of graphene, hexagonal boron nitride, molybdenum disulfide, tungsten disulfide or sheets of mixtures thereof.

15 Claims, 8 Drawing Sheets

(51) Int. Cl.

| | | |
|---|---|---|
| *C01G 41/00* | (2006.01) | |
| *C01B 35/14* | (2006.01) | |
| *C01B 39/06* | (2006.01) | |
| *B32B 33/00* | (2006.01) | |
| *C01B 32/05* | (2017.01) | |
| *B32B 37/24* | (2006.01) | |
| *B32B 38/10* | (2006.01) | |
| *C01G 39/06* | (2006.01) | |

(52) U.S. Cl.
CPC .............. *B82Y 30/00* (2013.01); *C01B 32/05* (2017.08); *C01B 35/14* (2013.01); *C01B 39/06* (2013.01); *C01G 39/06* (2013.01); *C01G 41/00* (2013.01); *C01B 2204/02* (2013.01); *C01B 2204/04* (2013.01); *C01B 2204/22* (2013.01); *C01P 2002/72* (2013.01); *C01P 2002/82* (2013.01); *C01P 2004/03* (2013.01)

(58) Field of Classification Search
CPC ........ C01G 41/00; C01G 39/06; B82Y 30/00; C01P 2004/03; C01P 2002/82; C01P 2002/72
See application file for complete search history.

(56) References Cited

U.S. PATENT DOCUMENTS

| | | |
|---|---|---|
| 2012/0241690 A1 | 9/2012 | Janowska et al. |
| 2013/0065034 A1* | 3/2013 | Muramatsu .......... H01B 13/321 |
| | | 428/213 |
| 2013/0099195 A1 | 4/2013 | Seacrist et al. |
| 2013/0108839 A1* | 5/2013 | Arnold .................. C01B 32/194 |
| | | 428/195.1 |

OTHER PUBLICATIONS

Yu, Yan, et al. "Room temperature rubbing for few-layer two-dimensional thin flakes directly on flexible polymer substrates." Scientific reports 3 (2013): 2697.*
Mag-isa, Alexander E., et al. "A systematic exfoliation technique for isolating large and pristine samples of 2D materials." 2D Materials 2.3 (2015): 034017.*
Corso, Martina, et al. "Boron nitride nanomesh." Science 303.5655 (2004): 217-220.*
International Search Report issued by the International Searching Authority (ISA/O.E.P.M.) dated Dec. 2, 2015 in connection with International Application No. PCT/ES2015/070832.
Chen, Jintao, et al. Graphene layers produced from carbon nanotubes by friction. Carbon, 2012, vol. 50, No. 5, p. 1934-1941; apartado 2.
Mailian, A.R.; Shmavonyan, G. Sh; Mailian, M. R. Self-Organized Graphene/Graphite Structures Obtained Directly on Paper. <http://arvix.org/abs/1402.3929>.
Yan, et al. Universal ultrafast sandpaper assisting rubbing method for room temperature fabrication of two-dimensional nanosheets directly on flexible polymer substrate. Applied Physics Letters, 2012, vol. 101, n° 7, p. 073113; página 073113-1, anexo.
European Search Report issued by the European Patent Office dated Nov. 2, 2018 in connection with European Application No. EP 15 87 5286.

* cited by examiner

METHOD FOR PRODUCING SHEETS OF GRAPHENE

TECHNICAL FIELD OF THE INVENTION

The present invention relates to a method for obtaining sheets of graphene, boron nitride, molybdenum disulfide, tungsten disulfide or mixtures thereof. The invention also describes a method for coating a surface with sheets of graphene, boron nitride, molybdenum disulfide, tungsten disulfide or sheets of mixtures thereof.

STATE OF THE ART

Graphite, boron nitride, molybdenum disulfide and tungsten disulfide are known in the state of the art as materials with structures organized in layers at the molecular level with weak binding forces between said layers. These layers are capable of sliding on one another with small tractive forces. They are herein referred to as "multilayer materials."

The most widely used methods for delaminating the most popular multilayer material, i.e., graphite consisting of graphene layers, comprise the use of solvents.

The paper by Janowska (Janowska, I, Carbon, 2012, volume 50, pages 3106-3110) discloses obtaining graphene and few-layer graphene by means of the mechanical ablation of pencil leads that are made of graphite and binders. Said ablation not only consists of graphene layer sliding but also layer breakage and separation. Said process is performed by rubbing pencil leads with a quartz disk. A graphene sheet is deposited in said quartz disk. The disk is submerged in a bath with a solvent and sonicated to remove graphene sheets from the surface of the quartz. Said sheets have a mean size of 2 µm. Graphene layers with a perfect hexagonal framework and others with a hexagonal framework with gaps or corrugations are obtained in the multilayer sheets. Sheets containing one to fifty layers are obtained with this method.

The document by Chabot et al. (Chabot, V. et al., Scientific Reports, 3, Article number: 1378, published on Mar. 12, 2013) describes obtaining sheets having few graphene layers, i.e., about seven layers, by means of sonicating graphite powder (5 to 15 µm) with acacia gum.

With respect to methods that do not use solvents, patent application EP 2567938 A1 describes coating multilayer graphenes on a surface, where said coating is obtained from laminating multilayer graphenes directly on the surface to be coated. The multilayer graphenes used consist of aggregation of many multilayer graphenes which can have a thickness ranging from 0.34 to 10 nm. This patent document explains different multilayer graphene lamination methods. One of said lamination methods consists of rubbing the multilayer graphenes with the surface to be coated, wherein said surface is a metallic surface, paper, glassy carbon or sapphire.

A method which allows obtaining a sheet of graphene, boron nitride, molybdenum disulfide or tungsten disulfide or mixtures thereof without using any solvents and in which the sheets are obtained in a simple and cost-effective manner from the powder of the materials, i.e., from graphite, boron nitride, molybdenum disulfide or tungsten disulfide powder, is not known in the state of the art.

DESCRIPTION OF THE INVENTION

The inventors of the present invention have developed a method for obtaining sheets formed by a net of strips, wherein said strips in turn comprise between one and five layers, wherein each layer has a thickness of one atom or one molecule of a material selected from the group consisting of graphene, boron nitride, molybdenum disulfide and tungsten disulfide, wherein said process comprises rubbing at least one powder of multilayer material selected from graphite powder, boron nitride powder, molybdenum disulfide powder or tungsten disulfide powder, between two substrates. The sheet made up of a material consisting of strips having few layers of the material will be formed on at least one of the substrates. The sheets thus formed are corrugation- or gap-free.

The method comprises rubbing two substrates with one another by hand or by mechanical means, preferably under ambient temperature and pressure conditions, wherein there is placed between the substrates a powder of multilayer material selected from the group consisting of graphite, boron nitride, preferably hexagonal boron nitride, molybdenum disulfide, tungsten disulfide and a mixture thereof.

The process of the present invention reduces the production costs of these sheets formed from multilayer materials, particularly reducing the production costs of sheets formed by graphene layers. It also reduces production time and prevents the use of chemical reagents, solvents or complicated technological devices. With the technology of the present invention, sheets or materials coated with said sheets, which allow developing applications such as flexible electronic devices, paper- or plastic-based electronic devices, transparent electrodes, etc., can be obtained.

Therefore, in one aspect the present invention relates to a method for obtaining a sheet of graphene, boron nitride, molybdenum disulfide, tungsten disulfide or mixtures thereof, wherein said sheet consists of a set of strips, wherein said strips consist of between one and five layers of graphene, boron nitride, molybdenum disulfide or tungsten disulfide, wherein said layers have monoatomic or monomolecular thickness, and wherein said method comprises:
  a) placing powder of at least one multilayer material selected from the group consisting of graphite, boron nitride, molybdenum disulfide and tungsten disulfide, between two solid substrates, and
  b) rubbing the surfaces of said substrates with one another and with said powder, wherein said powder is placed between said surfaces,
to form said sheet on the surface of at least one solid substrate.

In a preferred embodiment, the method further comprises removing the sheet from the solid substrate on which it has been formed.

In another aspect, the invention relates to a method for coating a substrate with a sheet of graphene, boron nitride, molybdenum disulfide, tungsten disulfide or mixtures thereof, wherein said sheet consists of a set of strips, wherein said strips consist of between one and five layers of graphene, boron nitride, molybdenum disulfide or tungsten disulfide, wherein said layers have monoatomic or monomolecular thickness, and wherein said method comprises:
  a) placing powder of at least one multilayer material selected from the group consisting of graphite, boron nitride, molybdenum disulfide and tungsten disulfide, between two solid substrates, wherein at least one of said substrates is the one to be coated, and
  b) rubbing the surfaces of said substrates with one another and with said powder, wherein said powder is placed between said surfaces,
to form said sheet on the surface of the solid substrate to be coated.

In a preferred embodiment, the solid surface of at least one substrate has a roughness between 0.2 nm and 2 nm, preferably between 0.3 nm and 0.5 nm.

In one embodiment, both substrates are the same material and in another embodiment both substrates are different material.

In one embodiment, the substrate on which the sheet is deposited has a hardness on the Mohs scale between 4.5 and 10; preferably the substrate on which the sheet is deposited has a hardness on the Mohs scale of at least 7.

In another embodiment, the substrate on which the sheet is deposited is selected from:
a) inorganic materials, such as, for example,
   i. semiconductor materials,
   ii. dielectric materials; and
   iii. metals; or
b) other materials selected from the group consisting of plastic, paper and wood.

In one embodiment, the layers have a width between 5 nm and 50 μm.

In a particular embodiment, the powder of multilayer material has a mean particle size between 5 nm and 50 μm.

In a preferred embodiment, the powder of multilayer material used as the starting material is graphite powder and the sheet obtained after the method of the present invention consists of strips consisting of between one and five graphene layers, wherein each layer has a thickness of one carbon atom.

In a preferred embodiment, the powder of multilayer material used as the starting material is crystalline graphite powder and the sheet obtained after the method of the present invention consists of strips consisting of between one and five graphene layers, wherein the layer has a thickness of one carbon atom.

In a preferred embodiment, the powder of multilayer material used as the starting material is boron nitride powder, preferably crystalline boron nitride powder, more preferably crystalline hexagonal boron nitride powder, and the sheet obtained after the method of the present invention consists of strips consisting of between one and five boron nitride layers, preferably hexagonal boron nitride layers, wherein the layer has a thickness of the boron nitride molecule, preferably the hexagonal boron nitride molecule.

In another embodiment, the powder of multilayer material used as the starting material is a powder mixture of at least two materials selected from the group consisting of graphite, boron nitride, molybdenum disulfide and tungsten disulfide. In a preferred embodiment, the powder of multilayer material used as the starting material is a graphite and boron nitride powder mixture.

In one embodiment, rubbing is performed by hand. In another embodiment, rubbing is performed by mechanical means.

These aspects and preferred embodiments thereof are also further defined in the claims.

DETAILED DESCRIPTION OF THE INVENTION

Figure 1:
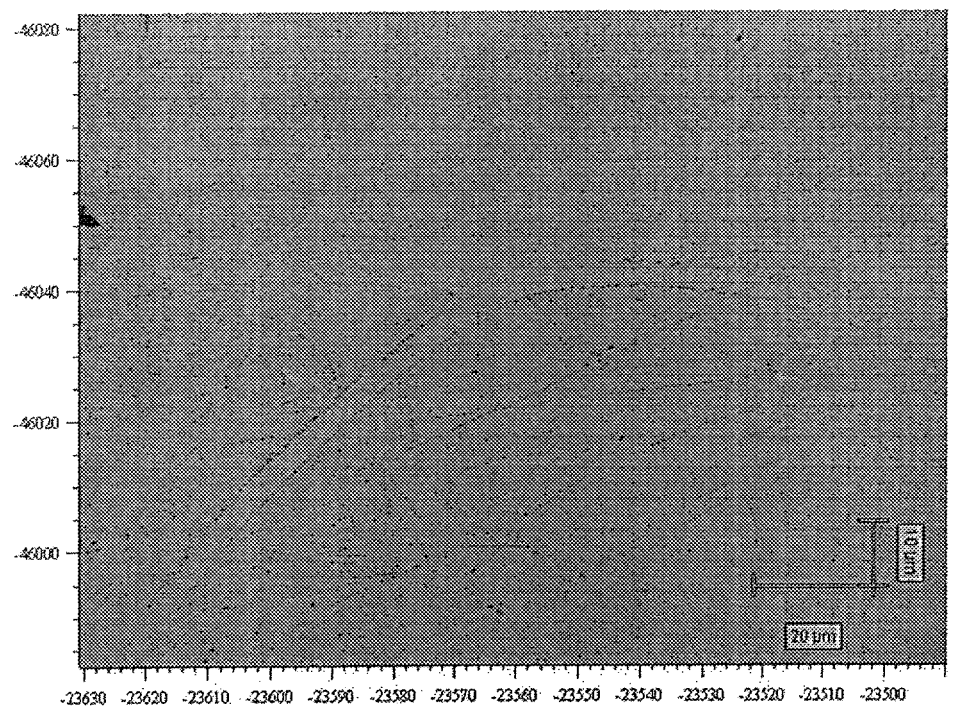
FIG. 1 shows an optical micrograph (5×) of monolayer and few-layer (between 2 and 4 layers) graphene strips on a silicon wafer, said strips being obtained by means of the rubbing of graphite powder placed between two silicon wafers for 500 circular cycles with an approximate pressure of 200 Pa (pressure applied with fingers).

In the context of the present invention, the following terms have the following meanings:

The term "sheet" refers to a two-dimensional material. The surface of the sheet is usually continuous, without gaps and corrugations. The dimensions of the sheet are obtained in the process and sheets having the desired dimensions can be obtained. The upper limit of the dimensions of the sheet is determined, during the process, by the dimensions of the surface of the substrate it covers. In one embodiment, the sheet has the same dimension as the surface of the substrate it covers. In another embodiment, the sheet partially covers the surface of the substrate. The terms "coat" and "cover" are equivalent in the present invention.

In this invention, the terms "strip" and "band" are equivalent and refer to a material with one dimension being longer than the other. These strips are formed from between one and five layers of a material selected from graphene, boron nitride, preferably hexagonal boron nitride, molybdenum disulfide and tungsten disulfide. In particular, due to the nature of graphene and hexagonal boron nitride, their layers in the present invention have a monoatomic thickness. Molybdenum disulfide and tungsten disulfide layers have a molecular thickness. The strips forming the sheet can be arranged such that they are superimposed on and/or intersect one another or in any relative arrangement with respect to one another, for example, organized parallel to one another in the sheet.

Strip width can vary between 5 nm and 50 μm, between 10 nm and 20 μm, between 50 nm and 200 nm, preferably from 55 nm to 180 nm, and more preferably from 60 to 150 nm. Due to their dimensions in the nanometer range, they can also be referred to as "nano-bands" or "nano-strips."

In one embodiment, the sheet consists of strips of the same material. In another embodiment, the sheet consists of strips of different materials, said sheet being referred to as heterostructure or heterosheet. In a preferred embodiment, the heterosheet consists of graphene strips and boron nitride strips, preferably hexagonal boron nitride strips. In another embodiment, the heterosheet consists of graphene strips and molybdenum disulfide strips. In another embodiment, the heterosheet consists of graphene strips and tungsten disulfide strips.

When the method is carried out to obtain a heterosheet, the present invention presents two possible methods:

In a first method, the heterosheet is obtained by placing, in step a), powder of at least two multilayer materials selected from the group consisting of graphite, boron nitride (preferably hexagonal boron nitride strips), molybdenum disulfide and tungsten disulfide.

In a second method, the heterosheet is obtained by carrying out the method of the invention using powder of a single multilayer material. After having obtained the sheet of said material, powder of a second multilayer material is placed between two solid substrates, wherein at least one comprises the previously obtained sheet of the first material.

In this invention, the term "layer" refers to each two-dimensional structure that is one atom or molecule thick, i.e., having a monoatomic or monomolecular thickness. For example, a graphene layer refers to a layer with a thickness of one carbon atom and corresponds to the thickness of a single graphene layer.

The strips can comprise one, two, three, four or five layers, which is referred to in this invention as "few-layer" strips.

In this invention, the term "multilayer" refers to more than 5 layers.

Layer width can range from 5 nm to 50 μm, between 10 nm and 20 μm, preferably from 50 nm to 200 nm, preferably from 55 nm to 180 nm, and more preferably from 60 to 150 nm.

In a preferred embodiment, the sheet consists of strips and these in turn consist of graphene layers. Graphene is a substance consisting of pure carbon, with atoms arranged in a regular hexagonal pattern in a ply that is one atom thick. The terms "ply" and "layer" can be used as equivalents herein. In the present invention, a sheet consisting of strips consisting of between one and five graphene layers are referred to as a "graphene sheet", and a strip consisting of between one and five graphene layers are referred to as a "graphene strip."

In another embodiment, the sheet consists of strips and these in turn consist of hexagonal boron nitride layers. Hexagonal boron nitride has a hexagonal structure, wherein the nitrogen and boron atoms are bound by covalent bonds on the same plane. The thickness of a hexagonal boron nitride layer therefore is an atomic thickness, for example.

In another embodiment, the sheet consists of strips and these in turn consist of molybdenum disulfide layers. The molybdenum in molybdenum disulfide has a trigonal prismatic coordination sphere to which sulfur atoms bind, and each sulfur atom binds in a pyramidal manner to three molybdenum atoms, forming a laminar structure wherein the molybdenum atoms are located between the sulfur atoms. When reference is made in this invention to a molybdenum disulfide layer, it refers to this laminar structure.

In another embodiment, the sheet consists of strips and these in turn consist of tungsten disulfide layers (or also referred to as wolfram disulfide). Tungsten disulfide also has a laminar structure which is the one referred to in this invention when reference is made to a layer.

The term "thickness" is used in this invention to indicate the smallest of the dimensions of the layer or sheet. The "thickness" of the strips is defined as the number of layers.

The expression "placing powder" means putting, locating, positioning or disposing the powder of the multilayer material between substrates.

The mass or amount of powder to be used depends on the surface area of at least one substrate on which the sheet is to be formed.

In a preferred embodiment, the amount of powder of starting multilayer material is between 0.25 $ng/mm^2$ and 5 $ng/mm^2$. In another embodiment, between 0.5 $ng/mm^2$ and 2.5 $ng/mm^2$ are used. In another embodiment, at least 0.75 $ng/mm^2$ of powder are used. In another embodiment, at least 1 $ng/mm^2$ is used. The expression "$ng/mm^2$" is understood as ng of powder per mm² of surface area of the substrate on which the sheet is to be formed.

By way of illustration, silicon wafers pre-cut into square fragments measuring 10 mm sidewise (surface=100 mm²) are used in the examples of the present invention. Therefore, if 25 ng of graphite powder were used in an example, the mass per unit area used was 25 ng/100 mm²=0.25 ng/mm². It must be highlighted that, due to material loss during the rubbing process, it is always advisable to put a larger amount than the theoretical amount required for forming a graphene monolayer, covering the entire surface. Said theoretical amount is calculated in the state of the art. According to said calculation, one gram of (monolayer) graphene theoretically covers 2630 m² of surface (2630 m²/g, see, for example, B. Kuchta et al. Journal of American Chemical Society, 2012, 134, 15130-15137).

The term "powder" refers to "powder of multilayer material" and preferably refers to crystalline powder. The crystalline powder can in turn be polycrystalline or monocrystalline powder. Therefore, in one embodiment the powder is polycrystalline powder. In another embodiment, the powder is monocrystalline powder. The powder is constituted so it can be referred to as powder grains, particles or nanoparticles, so when reference is made in this invention to "size of the powder", it means the "size of the powder grains, particles or nanoparticles." In this invention, the terms powder grains, particles and nanoparticles can be equivalent, since the grains or particles have a size in the range of nm, wherein said range in this invention is defined between 5 nm and 500 nm, said particles or grains are considered nanoparticles.

In one embodiment, the size of the powder of the multilayer material is between 50 µm and 5 nm. In another embodiment, the powder of the multilayer material has a size between 20 µm and 10 nm. In another embodiment, the powder of the multilayer material has a size between 10 µm and 20 nm, and in another embodiment between 50 µm and 50 nm, preferably from 55 nm to 180 nm, and more preferably from 60 to 150 nm. In any of these embodiments, the powder of multilayer material can be crystalline powder.

Methods for measuring the size of the crystalline domain are known in the state of the art. The Scherrer formula can be used, for example, based on the X-ray diffraction values. A crystalline powder particle can consist of one or more crystalline domains, so the size of the crystalline domain is the minimum size of the material. The size of the crystalline domain is between 5 nm and 200 nm, preferably between 10 nm and 60 nm, and more preferably between 15 nm and 60 nm.

In a preferred embodiment, graphite powder is used. Commercial graphite powder particles or grains usually have a size with an upper limit of 50 µm, since they are passed through a sieve of this size. Said graphite powder particles or grains can result from the aggregation of several smaller sized particles or of nanoparticles.

Additionally, in one embodiment the size of the crystalline domain of the graphite is between 5 nm and 200 nm, in another embodiment between 10 nm and 60 nm, and preferably about 50 nm. The crystalline graphite powder particles or grains can result from the aggregation of several particles or of nanoparticles.

Both the graphite powder and the crystalline graphite powder can be ground to obtain smaller particle sizes.

The size of these grains/particles/nanoparticles in graphite crystalline powder can be measured by means of X-ray diffraction. A graphite powder particle can consist of one or more crystalline domains, so the size of the crystalline domain is the minimum size of the material, i.e., graphite powder particles can have sizes up to 5 nm.

Therefore, in one embodiment the size of the graphite powder is between 50 µm and 5 nm. In another embodiment, the size of the graphite powder is between 50 µm and 10 nm. In another embodiment, the size of the graphite powder is between 50 µm and 15 nm. In another embodiment, the size of the graphite powder is between 50 µm and 50 nm.

In another particular embodiment, the graphite powder is highly oriented pyrolytic graphite (known in the art as HOPG).

In another embodiment, boron nitride powder is used. In one embodiment, commercial boron nitride powder sieved with a 10-µm sieve is used. In one embodiment, the size of the crystalline domain is between 50 and 200 nm. In another embodiment, the size of the crystalline domain is between 100 and 200 nm and more preferably between 150 and 180 nm. The boron nitride powder can be ground to reduce its size. In one embodiment, the size of the boron nitride powder is between 50 µm and 5 nm. In another embodiment, the size of the boron nitride powder is between 50 µm and 10 nm, preferably between 50 µm and 50 nm and more preferably between 10 µm and 100 nm.

The method of the present invention does not use solvents.

The "substrate" of the present invention is solid. The terms "solid substrate" and "substrate" are used interchangeably in this text. In one embodiment, both solid substrates, between which the powder of multilayer material is placed, are different material. In another preferred embodiment, both solid substrates, between which the powder of multilayer material is placed, are the same material. The substrates can be formed by the following materials:
  a) inorganic materials, such as, for example,
    i. semiconductor materials,
    ii. dielectric materials;
    iii. metals; or
  b) other materials.

In a preferred embodiment, the substrate on which the sheet is formed is inorganic.

In one embodiment, at least one substrate consists of a semiconductor material. In a preferred embodiment, the semiconductor material is selected from the group consisting of silicon and silicon carbide. In one embodiment, at least one substrate consists of silicon crystal.

In one embodiment, at least one substrate consists of a dielectric material. In a preferred embodiment, the dielectric material is selected from the group consisting of ceramic, mica and glass. The ceramic materials can be an oxide type, a non-oxide type or a composite type. In a preferred embodiment, the ceramic material is porcelain. In a particular embodiment, the ceramic material is an oxide type, preferably a metal oxide of a transition metal. In a particular embodiment, the ceramic material is of an oxide type and is selected from alumina, beryllium oxide, cerium oxide, zinc oxide and zirconia (also referred to as zirconium dioxide).

In one embodiment, at least one substrate consists of a metallic (metal) material, wherein the metal can be cobalt, copper, silver, gold, iron, platinum or palladium, preferably cobalt.

In another embodiment, at least one substrate consists of another material other than the inorganic materials described above, selected from the group consisting of plastic, paper and wood.

The original surface of the substrate on which the sheet is to be formed with the process of the invention has a roughness between 0.2 and 2 nm, preferably less than 1 nm, preferably between 0.3 nm and 0.5 nm, and more preferably less than 0.5 nm. The surface is preferably flat.

The substrate can have any hardness, for example greater than 1 on the Mohs scale. In a preferred embodiment, the substrate has a hardness on the Mohs scale between 4.5 and 10. In a more preferred embodiment, the substrate has a hardness on the Mohs scale of at least of 7.

The thickness of the substrate is irrelevant for the present invention. The surface area of the substrate is relevant for calculating the amount of powder required for obtaining a sheet of material formed by strips consisting of between 1 and 5 layers.

In a preferred embodiment, at least one substrate is a silicon crystal wafer. In another preferred embodiment, both substrates are silicon crystal wafers.

The surfaces of the substrates can be rubbed with one another in any direction, for example circular, linear, forming triangles, squares, etc., and at any angle with respect to the surface of the Earth, vertically or horizontally.

Not a lot of force is required for applying the pressure. For example, the pressure applied by two fingers of one and the same hand (for example, the thumb and index finger) on the substrates when performing rubbing movement by hand is enough to obtain the sheets of the present invention. In other words, the minimum pressure may have a value of about 0.1 kPa (100 Pa), i.e., the pressure fingers are known to apply. In one embodiment, rubbing is performed by hand. In another embodiment, rubbing is performed by mechanical means.

Rubbing is performed in several rubbing cycles. A "rubbing cycle" is defined as the rubbing movement which is performed between the substrates in order to return to an initial position and is repeated consecutively. The number of repetitions or cycles depends on the following characteristics:

The pressure or force applied when rubbing:
  The pressure and the number of cycles are inversely proportional.
  In a particular embodiment in which rubbing is performed by hand, i.e., between 0.1 kPa and 1 kPa, individual strips can be obtained with 20-50 cycles, but in order to obtain the sheets of the invention, between 400 and 1000 cycles, preferably more than 500 cycles, are required.
  In a particular embodiment in which rubbing is performed by mechanical means, for example, with a pressure between 1.1 kPa and 500 kPa, few cycles are required to obtain the sheets of the invention, preferably less than 100 cycles, more preferably less than 50 cycles.

The size of the powder of multilayer material:
  In an embodiment in which silicon substrates are used, rubbing is performed by hand and the graphite powder has a size between 50 nm and 50 µm; the number of cycles can range from 10 to 2000 cycles, respectively.

The amount of powder and substrate hardness:
  The amount of powder calculated according to the surface area, as mentioned above, is used. It must be pointed out that in the event of using substrates having a high hardness, i.e., substrates having a hardness greater than 4, preferably greater than 4.5 on the Mohs scale, for example silicon having a hardness of 7 on the Mohs scale, it is not that important if a larger amount of the powder of multilayer material is added because the excess powder will fall onto the substrates during the rubbing process. However, when using substrates having a low hardness, i.e., a hardness less than 4 in Mohs scale, for example mica having a hardness of 2.8 on the Mohs scale, it is essential to use the minimum amount of powder in relation to the surface of the substrate to prevent the powder from clumping on the substrate. Furthermore, when substrates having a low hardness are used, it is preferable to use low rubbing pressures, preferably 200 Pa or less.

Rubbing cycle speed
  Based on the examples that have been carried out, researchers consider that an increase in rubbing speed may have an effect similar to the effect of an increase in pressure, i.e., as the rubbing speed increases, the number of strips per rubbing cycle increases and the number of required cycles decreases. Furthermore, there seems to be another similarity in that when two silicon substrates are used and the speed and/or pressure greatly increases, the rubbing cycles required for obtaining the sheets cannot be performed since the two sheets formed in each of the substrates tend to bind to one another during rubbing, the rubbing therefore being blocked.

The preferred rubbing speed is between 5 and 100 cm/s, and in another embodiment, the rubbing speed is between 10 and 50 cm/s. In another embodiment, the rubbing speed is between 10 and 30 cm/s. These speeds are approximate speeds calculated for substrates with a surface area of 1 cm$^2$.

In a preferred embodiment, step c), which comprises removing the sheet obtained in step b) on the at least one solid substrate on which said sheet has been formed, is additionally performed in the method. Said step c) can be performed using any transfer method known in the art, preferably using the method known in the art of adhesive tape (cellophane tape) (see Example 6).

As it is used herein, the term "about" means a slight variation of the specified value, preferably within 10% of the specified value. Nevertheless, the term "about" can mean a higher variation tolerance depending on the experimental technique used, for example. The skilled person understands said variations of a specified value and they are encompassed in the context of the present invention. Furthermore, in order to provide a more concise description, the term "about" is not used for some of the quantitative expressions provided herein. It is understood that regardless of whether or not the term "about" is explicitly used, each amount given herein seeks to refer to the real given value, and also to the approximation of such value given that it could be reasonably deduced based on common experience in the art, including equivalents and approximations due to the experimental and/or measurement conditions for such given value.

These aspects and preferred embodiments are also additionally defined in the claims.

Some examples of the experimental methods and embodiments of the present invention are described below to more readily understand the preceding ideas. Said examples are merely illustrative.

EXAMPLES

Example 1

Influence of Rubbing on the Formation of Graphene Nano-Bands and Sheets Obtained by Means of the Method of the Present Invention At least 200 ng (2 ng/mm$^2$) of graphite powder (with a crystalline domain size=19.5 nm, obtained by a grinding process) or powder with a crystalline domain size=47.1 nm (Merck commercial grade)) are placed between 2 silicon wafers (mean roughness of 0.5 nm in 15 microns and hardness of 7 on the Mohs scale). The silicon wafers have a silicon dioxide layer of less than 5 nm.

The silicon wafers of the examples are silicon wafers 4 inches in diameter, pre-cut into square fragments measuring 10 mm sidewise (surface=100 mm$^2$) (specifically, sold as 55 pre-cut fragments).

Therefore, the concentration of powder per unit area is 200 ng/100 mm$^2$=2 ng/mm$^2$. Rubbing is performed by hand in a concentric manner with different rubbing cycles: 250 (FIG. 6a), 400 (FIG. 2a), 500 (FIGS. 1 and 6b), 800 (FIG. 2b), 1000 (FIG. 6c) and 2000 (FIG. 6d) and also with different pressure applied during rubbing: 100 Pa (FIG. 5a), 200 Pa (FIGS. 1-4 and 6) and 3 kPa (FIG. 5b).

FIG. 2a shows that in the case of a smaller number of rubbing cycles (400 or less), graphite spots, as well as multilayer or few-layer (<5) graphene nano-bands are formed on the silicon wafer (also see FIG. 6a). By increasing the number of rubbing cycles, the graphite spots disappear and the number of graphene nano-bands increases (FIG. 2b and FIGS. 6a and 6b). Only monolayer or few-layer graphene sheets are obtained after 500 rubbing cycles or more (FIG. 1).

Figure 2:
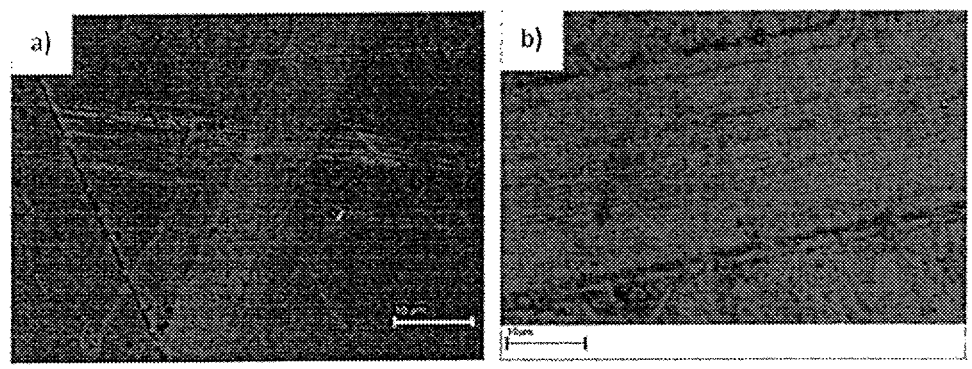
FIG. 2 shows the SEM (Scanning Electron Microscopy) images of monolayer and few-layer graphene nanostrips on a silicon wafer, said strips being obtained by means of the rubbing of graphite powder placed between two silicon wafers for a) 400 circular cycles or b) 800 circular cycles with an approximate pressure of 200 Pa (pressure applied with fingers).
Figure 3:
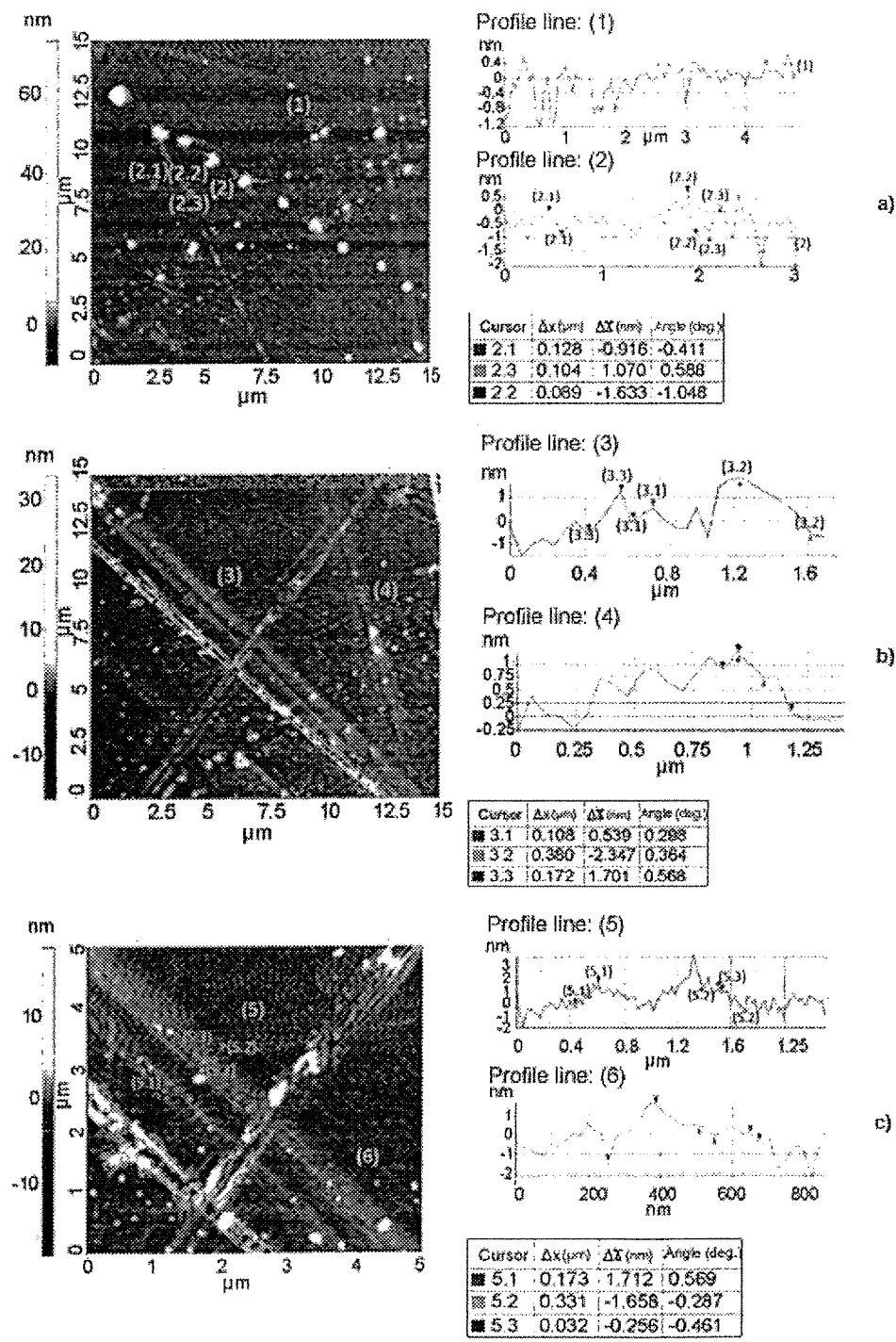
FIG. 3 shows the AFM (Atomic Force Microscopy) image, measuring 15 μm×15 μm (a) and b)) and 5 μm×5 μm (c)), of monolayer and few-layer (between 2 and 4 layers) graphene strips on a silicon wafer, said strips being obtained by means of the rubbing of graphite powder placed between two silicon wafers for 500 circular cycles with an approximate pressure of 200 Pa (pressure applied with fingers).
Figure 4:
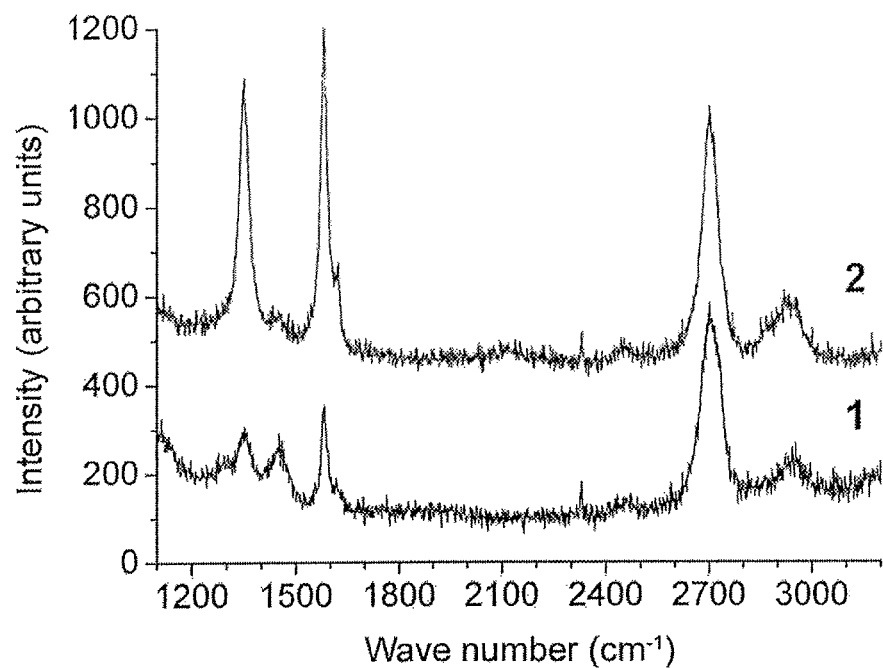
FIG. 4 shows the Raman spectrum of monolayer and few-layer (between 2 and 4 layers) graphene strips on a silicon wafer, said strips being obtained by means of the rubbing of graphite powder placed between two wafers for 500 circular cycles with an approximate pressure of 200 Pa (pressure applied with fingers).
Figure 11:
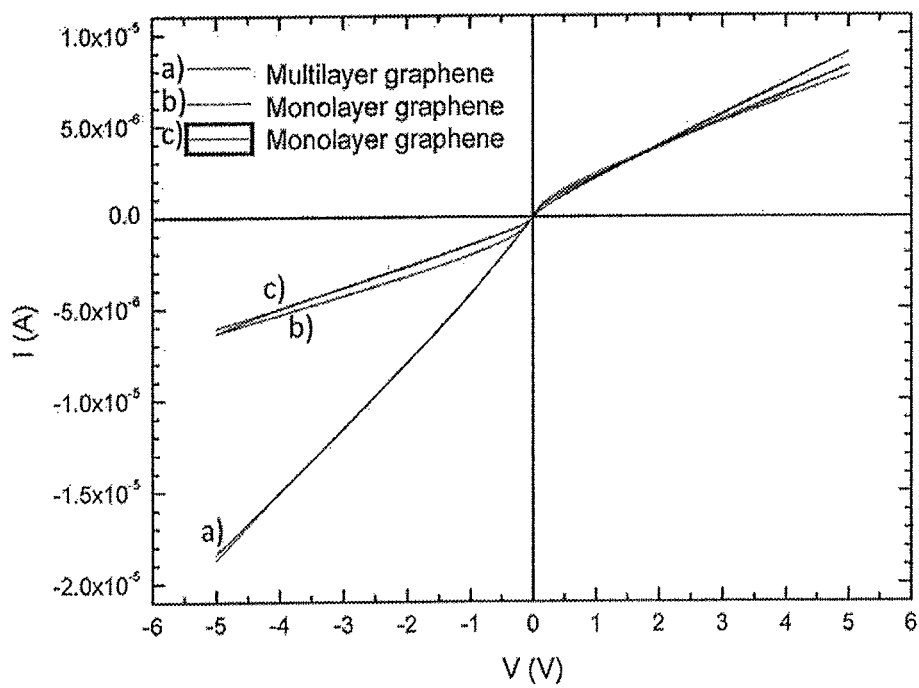
FIG. 11 shows the current-voltage (I-V) curve of a) few-layer (between 2 and 4 layers) graphene strips, and b) and c) monolayer graphene strips, on a silicon wafer, said strips being obtained by means of 1000 circular rubbing cycles with an approximate pressure of 200 Pa (pressure obtained by means of applying pressure with fingers).
Figure 12:
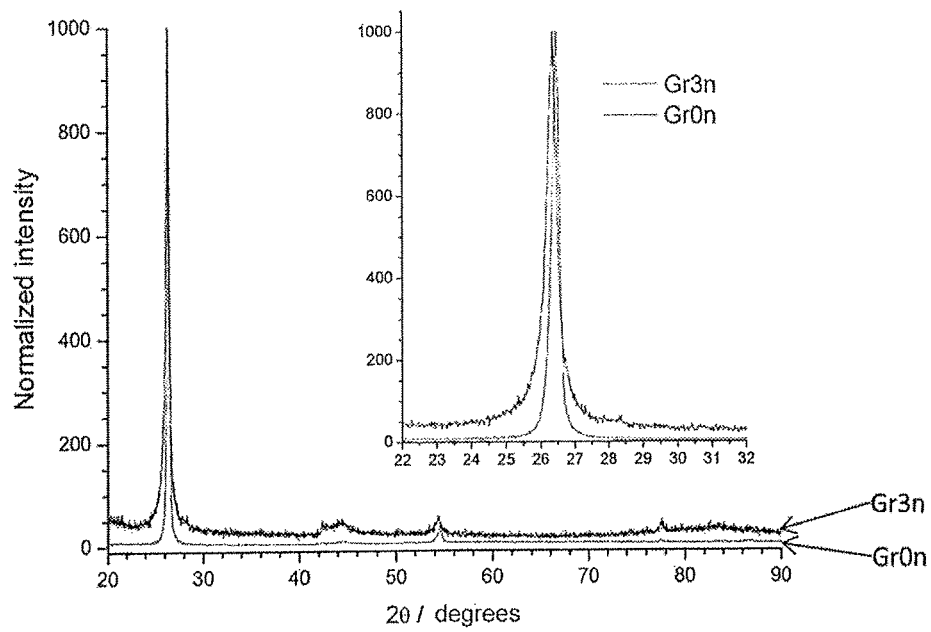
FIG. 12 shows the X-ray diffraction of commercial graphite (Gr0n) and ground graphite (Gr3n). According to the Debye-Scherrer equation, based on the diffraction peak width values at half the maximum intensity (subtracting the instrumental contribution to this peak width), the following crystal size values were obtained in each case: Gr0n: 47.1 nm; Gr3n: 19.5 nm.

FIGS. 1 to 3 show the formation of monolayer and few-layer nano-bands (FIGS. 2a and 3) and sheets (FIG. 1 and FIG. 2b) on silicon wafers, where these nano-bands and sheets can be differentiated by means of light microscopy (FIGS. 1, 5 and 6), scanning electron microscopy (FIG. 2), atomic force microscopy (FIG. 3), Raman spectroscopy (FIG. 4) and electric characterization (curves I-V, FIG. 11).

These results confirm that the formation of graphene nano-bands and sheets depends on the number of rubbing cycles.

Example 2

Figure 5:
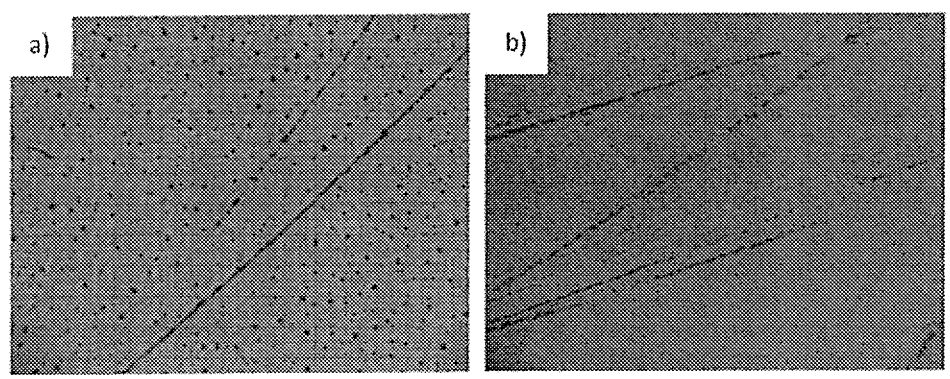
FIG. 5 shows the optical micrograph (20×) of monolayer and few-layer (between 2 and 4 layers) graphene strips on a silicon wafer, said strips being obtained by means of the rubbing of graphite powder placed between two silicon wafers for 200 circular cycles with an approximate pressure of a) 100 Pa (low) and b) 3 kPa (high).
Figure 6:
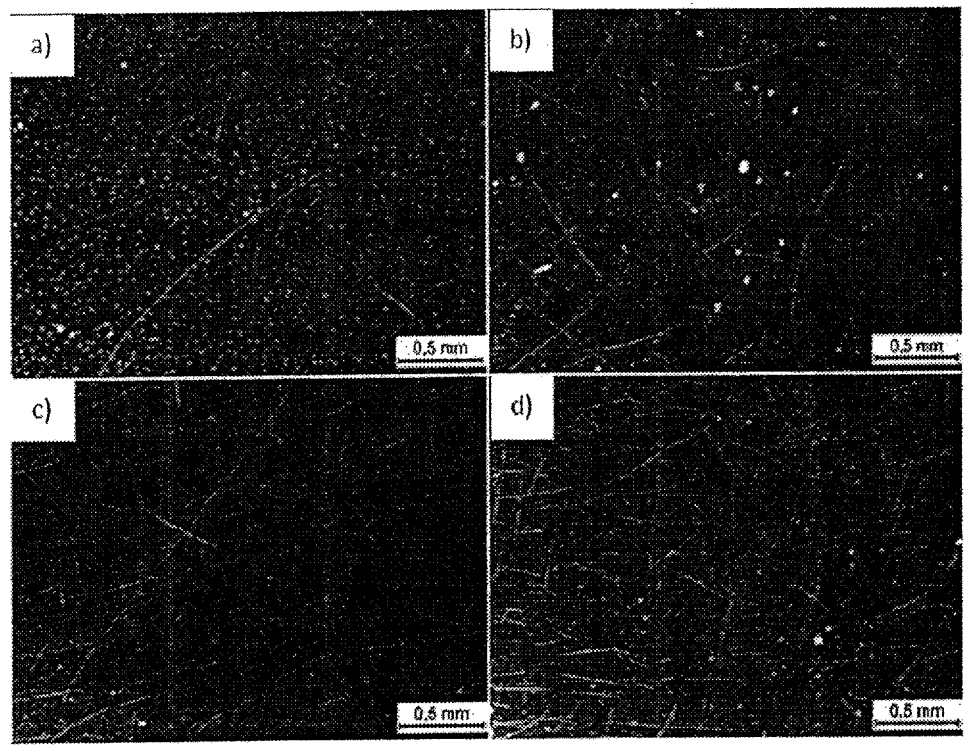
FIG. 6 shows the optical micrographs (50×) of monolayer and few-layer (between 2 and 4 layers) graphene strips on a silicon wafer, said strips being obtained by means of the rubbing of graphite powder placed between two silicon wafers at a pressure of about 200 Pa (pressure applied with fingers) and different number of rubbing cycles: a) 250, b) 500, c) 1000 and d) 2000.

Influence of the Applied Pressure on the Formation of Graphene Nano-Bands Obtained by Means of the Method of the Present Invention FIG. 5 shows that the appearance of monolayer and few-layer graphene (<5) nano-bands on the silicon wafers depends on the pressure applied during rubbing. In the case of small pressures applied by hand (about 200 Pa), what is obtained on the silicon wafer is mainly graphite spots and a small number of graphene nano-bands (FIG. 5a). By increasing the applied pressure (about 3 kPa) and for the same number of rubbing cycles, the amount of graphite spots decreases and what is formed on the silicon wafer is mainly graphene nano-bands (FIG. 5b).

These results confirm that the number (density) of the nano-bands depends on the applied pressure.

Therefore, the number of graphene nano-bands depends on both the number of rubbing cycles and the pressure applied during rubbing.

Example 3

Influence of Rubbing Cycles and the Applied Pressure on the Formation of Boron Nitride Nano-Bands Obtained by Means of the Method of the Present Invention At least 200 ng (200 ng/100 mm$^2$=2 ng/mm$^2$) of hexagonal boron nitride powder (with a crystalline domain size=184 nm, Goodfellow commercial grade) are placed between two silicon wafers (10 mm sidewise (surface=100 mm$^2$), approximate roughness=0.5 nm in 15 microns; hardness on the Mohs scale=7) with a silicon dioxide layer with a thickness less than 5 nm and 1000 rubbing cycles are performed by hand.

Figure 7:
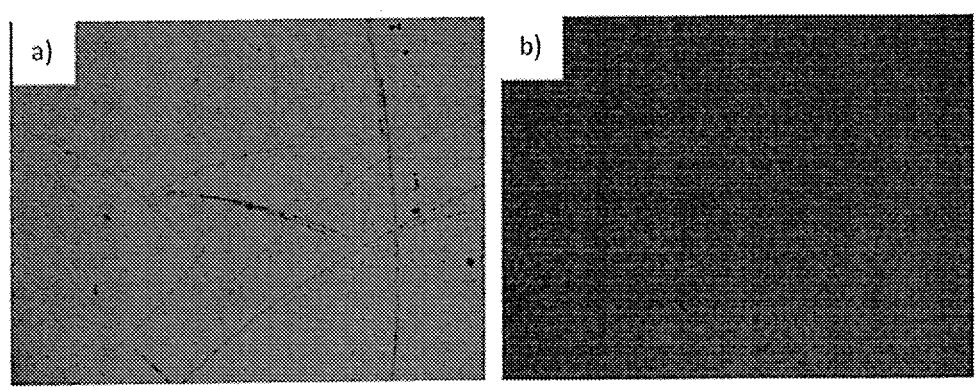
FIG. 7 shows the optical micrographs a) (5×), b) (100×) of monolayer and few-layer (between 2 and 4 layers) boron nitride strips on a silicon wafer, said strips being obtained by means of the rubbing of boron nitride powder placed between two silicon wafers for 1000 circular rubbing cycles with an approximate pressure of 200 Pa (pressure applied with fingers).
Figure 9:
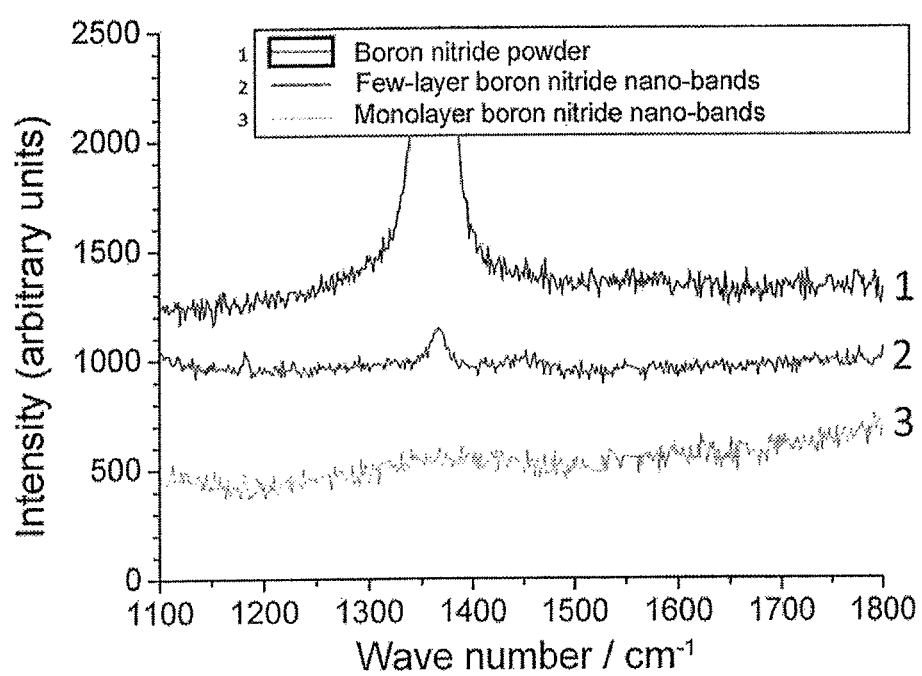
FIG. 9 shows the Raman spectrum of 1) boron nitride powder, 2) few-layer (between 2 and 4 layers) boron nitride strips, and 3) monolayer boron nitride strips, on a silicon wafer, said strips being obtained by means of 1000 circular rubbing cycles with an approximate pressure of 200 Pa (pressure obtained by means of applying pressure with fingers).

FIG. 7 shows that both monolayer and few-layer boron nitride nano-bands are formed on the silicon wafer. These single-layer (monolayer), few-layer (between 2 and 4 layers) or multilayer boron nitride nano-bands can be differentiated by means of light microscopy (FIG. 7) and Raman spectroscopy (FIG. 9).

Like the graphene nano-bands, the characteristics of the boron nitride nano-bands depend on the applied pressure and the number of rubbing cycles.

Therefore, these results confirm that this technology is universal and allows obtaining nano-bands and sheets of graphene, boron nitride and any other two-dimensional material.

Example 4

Formation of Nano-Bands of Different Two-Dimensional Atomic Materials on the Same Silicon Wafer Obtained by Means of the Method of the Present Invention Method 1

At least 200 ng (2 ng/mm$^2$) of hexagonal boron nitride powder (with a crystalline domain size=184 nm, Goodfellow commercial grade) are placed between two silicon wafers (measuring 10 mm sidewise (surface=100 mm$^2$), approximate roughness=0.5 nm in 15 microns; hardness on the Mohs scale=7) with a silicon dioxide layer with a thickness less than 5 nm and 1000 rubbing cycles are performed by hand. After the formation of these boron nitride nano-bands, the rubbing cycles are stopped and 200 ng (2 ng/mm$^2$) (or more) of graphite powder (obtained by grinding the Merck commercial product; with a crystalline domain size=19.5 nm) is placed on the silicon wafer containing boron nitride nano-bands. The process of rubbing by hand continues (800 cycles). As a result, both boron nitride and graphene nano-bands are obtained on the same silicon wafer (FIG. 8).

Figure 8:
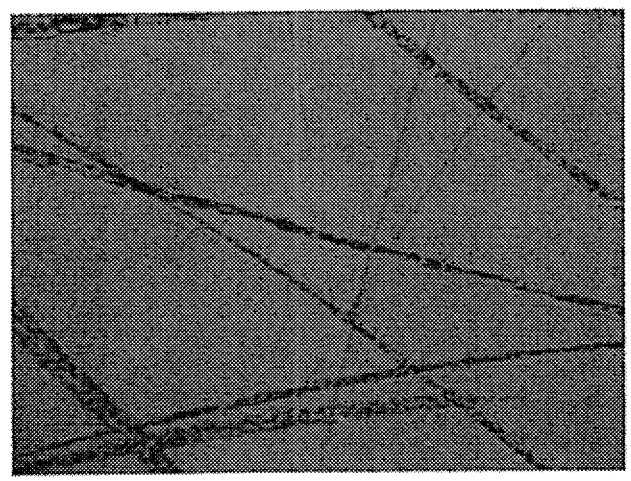
FIG. 8 shows the optical micrograph (20×) of graphene and boron nitride strips on a silicon wafer, after 1000 circular rubbing cycles for boron nitride powder and 800 circular rubbing cycles for graphite powder (Method 1, Example 4).

FIG. 8 shows the graphene and boron nitride nano-bands on a silicon wafer (pressure of about 200 Pa applied with fingers). The number of concentric rubbing cycles is 1000 for boron nitride and 800 for graphite powder.

Method 2

A 50% homogenous mixture of hexagonal boron nitride powder (Goodfellow commercial grade; with a crystalline domain having a size=184 nm) and graphite powder (obtained by grinding the Merck commercial product; with a crystalline domain size=19.5 nm) is prepared. This mixture is placed between two silicon wafers (approximate roughness=0.5 nm in 15 microns; hardness on the Mohs scale=7) with a silicon dioxide layer with a thickness less than 5 nm and 800 rubbing cycles are performed by hand. As a result, boron nitride and graphene nano-bands are obtained together (FIG. 13).

Figure 13:
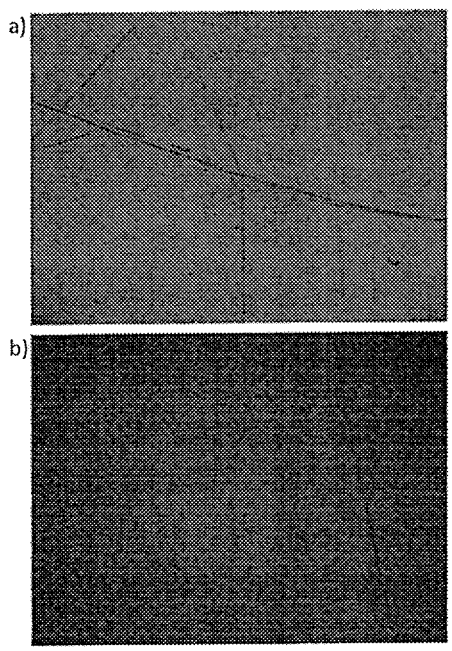
FIG. 13 shows the optical micrographs (a) 20×, b) 100×) of monolayer and few-layer graphene and boron nitride nano-bands on silicon wafers (pressure of about 200 Pa applied with fingers), said strips being obtained by means of a 50% mixture of graphite powder and boron nitride powder. The number of concentric rubbing cycles is 800.
Figure 14:
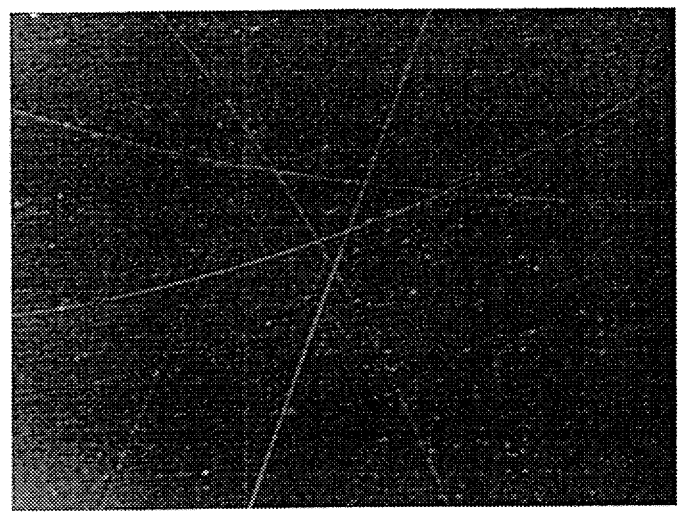
FIG. 14 shows the optical micrograph (5') of monolayer graphene strips, few-layer (between 2 and 4 layers) graphene strips and multilayer graphene strips on a silicon wafer, said strips being obtained by means of the rubbing of graphite powder placed between a silicon wafer and a mica wafer for 500 circular cycles with an approximate pressure of 200 Pa (pressure applied with fingers).

FIG. 13 shows graphene and boron nitride nano-bands on a silicon wafer. The number of rubbing cycles is 800. The rubbing is performed in a 50% mixture of hexagonal boron nitride powder and graphite powder.

These results confirm that the methodology proposed in the present invention allows obtaining nano-bands of different two-dimensional atomic materials on the same substrate.

Example 5

Formation of Heterostructures and Supernets of Different 2D Atomic Materials Obtained by Means of the Method of the Present Invention After obtaining graphene nano-bands and the subsequent rubbing of hexagonal boron nitride powder on the same silicon wafer by means of the method of the present invention, the formation of mixed graphene/boron nitride nanostructures is observed in the areas in which the graphene nano-bands and boron nitride nano-bands intersect one another (FIGS. 8 and 13). Therefore, it is clear that by means of the continuous repetition of the process of rubbing with powders of different two-dimensional atomic materials, heterostructures are formed in the areas in which the nano-bands intersect one another.

It is possible to obtain sheets of different two-dimensional atomic materials on a graphene sheet (FIG. 1) by means of subsequent rubbing with other powdery materials, supernets of two-dimensional atomic materials consisting of several sheets of graphene, boron nitride or other two-dimensional atomic materials, being formed.

Example 6

Transfer of Nano-Bands of 2D Atomic Materials Obtained by Means of the Method of the Present Invention from One Substrate to Another The nano-bands obtained on silicon wafers can be removed from the wafer by means of using an adhesive tape (cellophane tape). To that end, the adhesive tape is applied to the surface of the silicon wafer containing nano-bands and removed from the surface. During this process, the nano-bands stick to the adhesive tape. After applying the adhesive tape to the clean surface of another silicon wafer, it is observed that the graphene nano-bands are transferred to this second silicon wafer.

Figure 10:
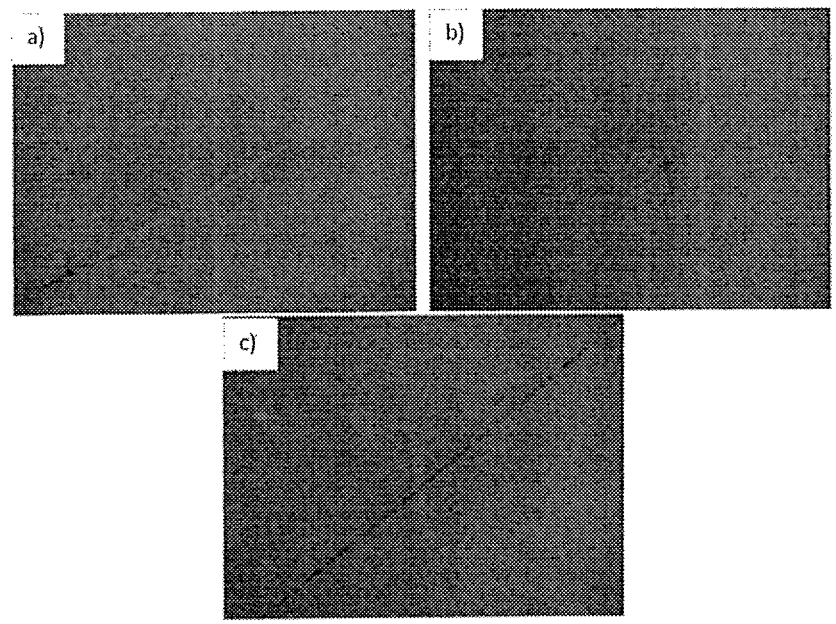
FIG. 10 shows the monolayer or multiplayer graphene strip transferred from the surface of the silicon substrate to a clean surface of another silicon substrate by means of using adhesive tape commonly referred to as cellophane tape.

FIG. 10 shows monolayer graphene nano-bands transferred from the surface of the silicon wafer to another clean surface (silicon or another material) by means of using adhesive tape.

These results confirm that it is possible to transfer nano-bands of graphene or another two-dimensional atomic material obtained by the method described in this invention from a silicon surface to another substrate by means of using adhesive tape.

Example 7

Method Using Substrates of Different Material: Silicon and Mica

At least 200 ng (2 ng/mm$^2$) of graphite powder (with a crystalline domain size=19.5 nm, obtained by a grinding process) or powder with a crystalline domain size=47.1 nm (Merck commercial grade)) are placed between a silicon wafer (mean roughness of 0.5 nm in 15 microns and hardness of 7 on the Mohs scale) and a mica disk (grade V1 muscovite, 9.5 mm in diameter and hardness of 2.8 on the Mohs scale). The silicon wafer has a silicon dioxide layer of less than 5 nm.

Therefore, the concentration of powder per unit area is 200 ng/100 mm$^2$=2 ng/mm$^2$. Rubbing is performed by hand in a concentric manner with different rubbing cycles: 250, 400, 500 (FIG. 13), 800 and 1000.

Monolayer and few-layer (between 2 and 4 layers) graphene strips, as well as some multilayer strips, can be seen in FIG. 13. The multilayer strips are eliminated by increasing the number of rubbing cycles.

The invention claimed is:

1. A method for obtaining a sheet of graphene, boron nitride, molybdenum disulfide, tungsten disulfide or mixtures thereof, wherein said sheet consists of a set of strips, wherein each strip consists of between one and five layers of graphene, boron nitride, molybdenum disulfide or tungsten disulfide, wherein said layers have monoatomic or monomolecular thickness, and wherein said method comprises:
    a) placing powder of at least one multilayer material selected from the group consisting of graphite, boron nitride, molybdenum disulfide and tungsten disulfide, between two solid substrates, wherein at least one of said solid substrates has a roughness between 0.2 and 2 nm; and
    b) rubbing the surfaces of said substrates between them and with said powder, wherein said powder is placed between said surfaces,
to form said sheet on the surface of at least one solid substrate.

2. The method according to claim 1 further comprising a step c) of removing the sheet obtained in step b) on the surface of at least one of the solid substrates wherein said sheet has been formed.

3. The method according to claim 1, wherein both solid substrates, between which the powder of multilayer material is placed, are the same material or different materials.

4. The method according to claim 1, wherein at least one of the solid substrates has a hardness in Mohs scale between 4.5 and 10.

5. The method according to claim 1, wherein at least one of the solid substrates is made up of a material selected from the group consisting of:
    c) inorganic materials selected from the group consisting of:
        i. semiconductor materials,
        ii. dielectric materials; and
        iii. metals; or
    d) other materials selected from the group consisting of plastic, paper and wood.

6. The method according to claim 5, wherein the solid substrate is made up of a semiconductor material selected from the group consisting of silicon and silicon carbide.

7. The method according to claim 5, wherein the solid substrate on which the sheet is formed is an inorganic metallic material selected from the group consisting of cobalt, copper, silver, gold, iron, platinum and palladium.

8. The method according to claim 1, wherein the sheets and/or layers have a width between 5 nm and 50 µm.

9. The method according to claim 1, wherein the powder multilayer material has a mean size particle between 5 nm and 50 µm, and wherein between 0.25 and 5 nanograms of powder per mm$^2$ of surface area of the substrate in which the sheet is to be formed are used.

10. The method according to claim 1, wherein the powder of multilayer material is graphite powder.

11. The method according to claim 1, wherein the powder of multilayer material is a powder mixture of at least two materials selected from the group consisting of graphite, boron nitride, molybdenum disulfide and tungsten disulfide.

12. The method according to claim 1, wherein between 0.25 and 5 nanograms of powder per mm$^2$ of surface area of the substrate in which the sheet is to be formed are used.

13. Method according to claim 1, wherein step b) is performed by applying a pressure of between 0.1 kPa and 1 kPa when rubbing is performed by hand, or between 1.1 kPa and 500 kPa when rubbing is performed by mechanical means, for between 400 and 1000 rubbing cycles when rubbing is performed by hand or less than 100 rubbing cycles when rubbing is performed by mechanical means, and at a rubbing speed of between 5 and 100 cm/s.

14. Method according to claim 1, wherein the sheet on the surface of the solid substrate is formed as a coating on the surface of the solid substrate to be coated.

15. A method for obtaining a sheet of graphene, wherein the sheet of graphene consists of a net of strips, wherein each strip comprise one, two, three, four or five graphene layers of monoatomic thickness, and wherein said method comprises:
   a) placing powder of graphite between two substrates, wherein at least one of said solid substrates has a roughness between 0.2 and 2 nm; and
   b) rubbing the surfaces of said substrates between them and with said powder, wherein said powder is placed between said surfaces, to form said sheet on the surface of at least one solid substrate.

* * * * *